US010291694B2

(12) United States Patent
Yao et al.

(10) Patent No.: US 10,291,694 B2
(45) Date of Patent: May 14, 2019

(54) METHOD AND APPARATUS FOR CONTROLLING DATA TRANSMISSION

(71) Applicant: BEIJING BAIDU NETCOM SCIENCE AND TECHNOLOGY, LTD., Beijing (CN)

(72) Inventors: Guang Yao, Beijing (CN); Miao Zhang, Beijing (CN); Yuchao Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 323 days.

(21) Appl. No.: 15/253,587

(22) Filed: Aug. 31, 2016

(65) Prior Publication Data

US 2017/0264675 A1 Sep. 14, 2017

(30) Foreign Application Priority Data

Mar. 14, 2016 (CN) .......................... 2016 1 0143849

(51) Int. Cl.

| | |
|---|---|
| ***H04L 29/08*** | (2006.01) |
| ***H04L 12/919*** | (2013.01) |
| *H04L 12/725* | (2013.01) |

(52) U.S. Cl.

CPC .......... *H04L 67/101* (2013.01); *H04L 47/765* (2013.01); *H04L 67/1014* (2013.01); *H04L 45/306* (2013.01)

(58) Field of Classification Search

None

See application file for complete search history.

(56) References Cited

U.S. PATENT DOCUMENTS

2002/0199060 A1* 12/2002 Peters ................. G06F 11/1076 711/114
2005/0213503 A1* 9/2005 Guo ........................ H04L 47/15 370/230
2006/0265709 A1* 11/2006 Meaney .................... G06F 8/63 717/178

(Continued)

FOREIGN PATENT DOCUMENTS

CN 102347907 A 2/2012
JP 2010-39767 A 2/2010

*Primary Examiner* — Thomas J Dailey

(74) *Attorney, Agent, or Firm* — Marshall, Gerstein & Borun LLP

(57) ABSTRACT

A method and apparatus for controlling data transmission includes: obtaining an amount of data, the data requested by a requesting server, an instructed deadline, and candidate source servers storing the requested data; obtaining, based on the amount of data, a minimum bandwidth required for transmitting the requested data before the deadline as a required bandwidth corresponding to the requested data; and selecting one of the candidate source servers as a source server for transmitting the requested data, based on the required bandwidth, bandwidth resources of the candidate source servers and the requesting server, and remaining bandwidth of links between the candidate source servers and the requesting server. This implementation implements the selection of the most appropriate source server from the holistic perspective, ensures that data transmission can be completed before the deadline, and effectively utilize the link bandwidth.

12 Claims, 5 Drawing Sheets

(56) References Cited

U.S. PATENT DOCUMENTS

| | | | | | |
|---|---|---|---|---|---|
| 2007/0226341 | A1 | 9/2007 | Mateo | | |
| 2009/0037968 | A1* | 2/2009 | Liu | H04N 7/17309 | 725/114 |
| 2010/0146136 | A1* | 6/2010 | Lou | H04L 65/80 | 709/231 |
| 2011/0131278 | A1* | 6/2011 | Nieh | H04L 67/104 | 709/204 |
| 2012/0297405 | A1* | 11/2012 | Zhang | H04H 20/08 | 725/9 |
| 2014/0143431 | A1* | 5/2014 | Watson | H04L 65/4084 | 709/227 |
| 2015/0172352 | A1* | 6/2015 | Gopalakrishnan | H04L 65/608 | 709/219 |
| 2016/0050155 | A1 | 2/2016 | Liu et al. | | |
| 2017/0019342 | A1 | 1/2017 | Wang et al. | | |

* cited by examiner

METHOD AND APPARATUS FOR CONTROLLING DATA TRANSMISSION

CROSS REFERENCE TO RELATED APPLICATION

This application claims the priority of Chinese Patent Application No. 201610143849.3, entitled "Method and Apparatus for Controlling Data Transmission," filed on Mar. 14, 2016, the content of which is incorporated herein by reference in its entirety.

TECHNICAL FIELD

The present application relates to the field of computer technology, particularly to the field of data transmission technology, and more particularly to a method and apparatus for controlling data transmission.

BACKGROUND

To provide quick responses, enterprises usually build large data centers (IDC, Internet Data Center) in multiple regions and each data center stores copies of data, in order to reduce the forwarding path of user requests. The synchronization and update of data among the data centers become increasingly prominent key issue. Currently in the prior art, data transmission between the data centers is generally implemented using the peer-to-peer (P2P) technology. A tracking server is used to record the data status and content currently being downloaded by each server (peer) in the data centers, to query, for each server that needs to download data, a list of other servers storing the data requested by that server, and to randomly select a server from the list of other servers as the source server for the data transmission, so as to complete the data transmission.

However, the prior art selects the source server at random, fails to select the most appropriate source server from a holistic perspective, cannot ensure that the data transmission can be completed before a given time, and cannot effectively utilize the link bandwidth.

SUMMARY

An objective of the present application is to provide a method and apparatus for controlling data transmission, in order to solve the technical problem mentioned in the foregoing Background section.

In a first aspect, the present application provides a method for controlling data transmission, which includes: obtaining an amount of data, the data requested by a requesting server, an instructed deadline, and candidate source servers storing the requested data; obtaining, based on the amount of data, a minimum bandwidth required for transmitting the requested data before the deadline as a required bandwidth corresponding to the requested data; and selecting one of the candidate source servers as a source server for transmitting the requested data, based on the required bandwidth, bandwidth resources of the candidate source servers and the requesting server, and remaining bandwidth of links between the candidate source servers and the requesting server.

In a second aspect, the present application provides another method for controlling data transmission, which includes: receiving a data transmission task, the data transmission task comprising a requirement data identifier, a deadline, and a destination server identifier; splitting data corresponding to the requirement data identifier into at least two fragments; using, for each of the at least two fragments, the fragment as requested data, the deadline as an instructed deadline, and a server corresponding to the destination server identifier as a requesting server, and selecting a source server corresponding to the fragment by using the method according to the first aspect, and generating a corresponding subtask, the subtask comprising: an identifier of the source server, the destination server identifier, and an identifier of the fragment; and sending the subtask corresponding to each of the at least two fragments to a source server corresponding to source server identifier information of the subtask and to a destination server corresponding to destination server identifier information, and controlling the source server and the destination server to perform data transmission.

In a third aspect, the present application provides an apparatus for controlling data transmission, which includes: an obtaining unit for obtaining an amount of data, the data requested by a requesting server, an instructed deadline, and candidate source servers storing the requested data; a required bandwidth determining unit for obtaining, based on the amount of data, a minimum bandwidth required for transmitting the requested data before the deadline as a required bandwidth corresponding to the requested data; and a source server determining unit for selecting one of the candidate source servers as a source server for transmitting the requested data, based on the required bandwidth, bandwidth resources of the candidate source servers and the requesting server, and remaining bandwidth of links between the candidate source servers and the requesting server.

In a fourth aspect, the present application provides another apparatus for controlling data transmission, which includes: a task receiving unit for receiving a data transmission task, the data transmission task comprising a requirement data identifier, a deadline, and a destination server identifier; a splitting unit for splitting data corresponding to the requirement data identifier into at least two fragments; a subtask generating unit for using, for each of the at least two fragments, the fragment as requested data, the deadline as an instructed deadline, and a server corresponding to the destination server identifier as a requesting server, and selecting a source server corresponding to the fragment by using the apparatus according to the third aspect, and generating a corresponding subtask, the subtask comprising: an identifier of the source server, the destination server identifier, and an identifier of the fragment; and a subtask control unit for sending the subtask corresponding to each of the at least two fragments to a source server corresponding to source server identifier information of the subtask and to a destination server corresponding to destination server identifier information, and controlling the source server and the destination server to perform data transmission.

According to the method and apparatus for controlling data transmission that are provided by the present application, the bandwidth required for transmitting the requested data before the deadline is obtained based on the amount of the requested data, and one of the candidate source servers is selected as a source server for transmitting the requested data, based on the required bandwidth, bandwidth resources of the candidate source servers and the requesting server, and remaining bandwidth of the links between the candidate source servers and the requesting server, thereby implementing the selection of the most appropriate source server from a holistic perspective, ensuring that data transmission can be completed before the deadline, and effectively utilizing the link bandwidth.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
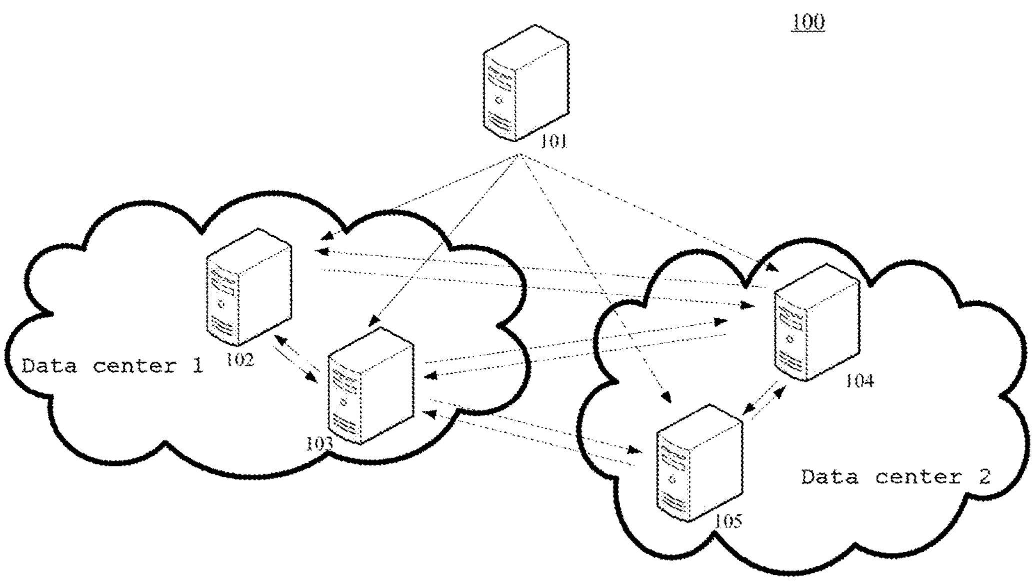
FIG. 1 is an architectural diagram of an exemplary system in which the present application may be implemented.

FIG. 1 shows an exemplary architecture of a system 100 which may be used by a method for controlling data transmission or an apparatus for controlling data transmission of the present application according to an embodiment of the present application.

As shown in FIG. 1, the system architecture 100 may include a control server 101, and servers 102, 103, 104, and 105.

The control server 101 may be a server providing various services. For example, the control server 101 resolves, according to information such as a network topology and bandwidth consumption, the data transmission tasks submitted by the servers 102, 103, 104, and 105 into subtasks that can actually run, and delivers the subtasks to corresponding servers.

Users may use the servers 102, 103, 104, or 105 to interact with the control server 101, so as to submit a data transmission task, etc. The servers 102, 103, 104, and 105 may be various electronic devices that support storage and communication. In actual operation, the servers 102, 103, 104, and 105 may be source servers of data transmission, or may be destination servers of data transmission. The servers 102 and 103 and the servers 104 and 105 are located in different data centers, and the data center 1 and the data center 2 may be data centers in the same domain, or may be data centers in different domains.

It should be noted that the method for controlling data transmission that is provided by the embodiment of the present application is generally executed by the control server 101. Correspondingly, the apparatus for controlling data transmission is generally disposed in the control server 101.

It should be appreciated that the numbers of control servers, servers and data centers in FIG. 1 are merely illustrative. Any number of control servers, servers, data centers, and domains may be provided based on the actual requirements.

Figure 2:
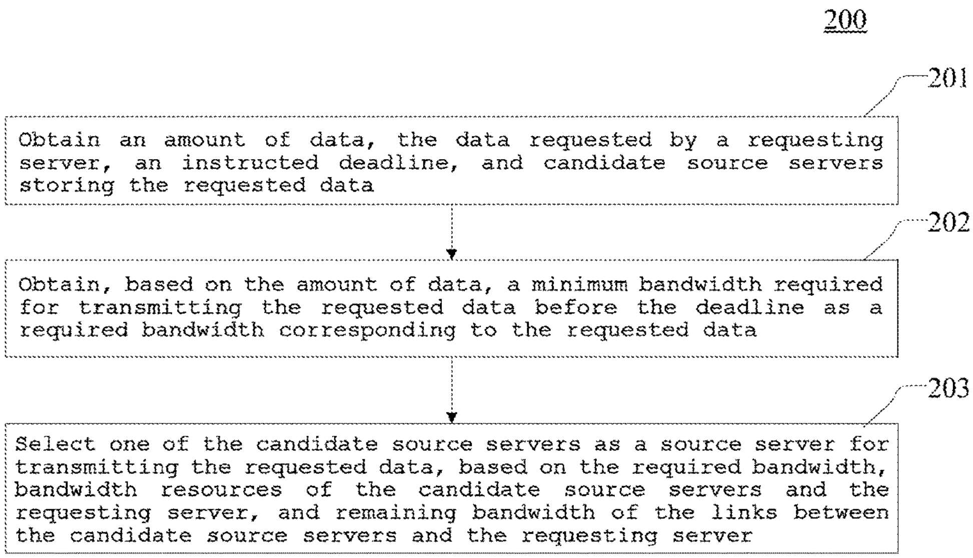
FIG. 2 is a flow chart of an embodiment of a method for controlling data transmission according to the present application.

Continue referring to FIG. 2, a flow 200 of a method for controlling data transmission according to an embodiment of the present application is shown.

As shown in FIG. 2, the method for controlling data transmission of this embodiment includes the following steps:

Step 201: Obtain an amount of data, the data requested by a requesting server, an instructed deadline, and candidate source servers storing the requested data.

In this embodiment, an electronic device (for example, the control server 101 shown in FIG. 1) on which the method for controlling data transmission runs may obtain, from a server storage information set (for example, a data table in a database) that is updated in real time, the amount of data that is requested by a requesting server (for example, the servers 102, 103, 104, and 105 shown in FIG. 1) and servers storing the requested data (for example, the servers 102, 103, 104, and 105 shown in FIG. 1), and use the servers storing the requested data as the candidate source servers.

Step 202: Obtain, based on the amount of data, a minimum bandwidth required for transmitting the requested data before the deadline as a required bandwidth corresponding to the requested data.

In this embodiment, the control server may first obtain a time length between the deadline and the current time, and then divide the amount of data by the time length to obtain the required bandwidth corresponding to the requested data.

Optionally, the control server may alternatively multiply the time length by a predetermined factor (for example, 0.9) or subtract a predetermined time length from the time length to obtain a new time length, and then divide the amount of data by the new time length to obtain the required bandwidth corresponding to the requested data, thereby better ensuring that data transmission can be completed before the deadline.

Step 203: Select one of the candidate source servers as a source server for transmitting the requested data, based on the required bandwidth, bandwidth resources of the candidate source servers and the requesting server, and remaining bandwidth of the links between the candidate source servers and the requesting server.

In this embodiment, the control server may select a candidate source server as the source server for transmitting the requested data, wherein the remaining bandwidth of the link between the candidate source server and the requesting server is greater than the required bandwidth; or may select a candidate source server as a source server for transmitting the requested data, wherein both the remaining bandwidth of the link between the candidate source server and the requesting server and the bandwidth resource of the candidate source server are greater than the required bandwidth.

In some optional implementations of this embodiment, step 203 may include: obtaining a required bandwidth corresponding to data currently downloaded by the requesting server, and determining a download bandwidth that the requesting server can allocate, based on the bandwidth resource of the requesting server, the currently downloaded data, and the required bandwidth corresponding to the requested data; obtaining, for each candidate server, a required bandwidth corresponding to data currently uploaded by the candidate source server, and determining an upload bandwidth that the candidate source server can allocate, based on the bandwidth resource of the candidate source server, the currently uploaded data, and the required bandwidth corresponding to the requested data; and selecting one of the candidate source servers as the source server for transmitting the requested data, based on the required bandwidth corresponding to the requested data, the download bandwidth, the upload bandwidth that each candidate source server can allocate, and the remaining bandwidth of the links between the candidate source servers and the requesting server.

Specifically, the control server may obtain the remaining amount of the data currently downloaded by the requesting server first, and then obtain the required bandwidth corresponding to the data currently downloaded by the requesting server by using a method similar to step 202, based on the remaining amount of data and the deadline. Optionally, if the bandwidth resource of the requesting server is greater than or equal to the sum of the required bandwidth corresponding to the currently downloaded data and the requested data, the download bandwidth may be equal to the required bandwidth corresponding to the requested data. Otherwise, the download bandwidth may be equal to: (the required bandwidth corresponding to the requested data)×(the bandwidth resource of the requesting server)÷(the sum of the required bandwidth corresponding to the currently downloaded data and the requested data). Based on a similar idea, the control server may obtain, for each candidate server, a required bandwidth corresponding to data currently uploaded by the candidate source server, and determine an upload bandwidth that the candidate source server can allocate, based on the bandwidth resource of the candidate source server, the currently uploaded data, and the required bandwidth corresponding to the requested data. Finally and optionally, the control server may select a candidate source server as the source server for transmitting the requested data, wherein the remaining bandwidth of the link between the candidate source server and the requesting server is not less than the smallest value among the required bandwidth corresponding to the requested data, the download bandwidth, and the upload bandwidth that can be allocated; or may select a candidate source server as the source server for transmitting the requested data, wherein the remaining bandwidth of the link between the candidate source server and the requesting server is not less than the required bandwidth corresponding to the requested data, the download bandwidth, and the upload bandwidth that can be allocated; or may select the source server for transmitting the requested data according to other selection criteria that can be figured out by those skilled in the art.

In some optional implementations of this embodiment, the process of selecting one of the candidate source servers as a source server for transmitting the requested data, based on the required bandwidth corresponding to the requested data, the download bandwidth, the upload bandwidth that each candidate source server can allocate, and the remaining bandwidth of the links between the candidate source servers and the requesting server may include: using a candidate server in the data center in which the requesting server is located as a selection criterion; and selecting, according to the selection criterion, one of the candidate source servers as the source server for transmitting the requested data. By preferably selecting a candidate server in the data center in which the requesting server is located as the source server for transmitting the requested data, so that not only the transmission speed is improved, but also the use of high-cost cross-data centers and cross-domain links is reduced.

On the basis of the above implementation, in some optional implementations of this embodiment, the process of selecting one of the candidate source servers as a source server for transmitting the requested data, based on the required bandwidth corresponding to the requested data, the download bandwidth, the upload bandwidth that each candidate source server can allocate, and the remaining bandwidth of the links between the candidate source servers and the requesting server may further include: if there is no candidate server in the data center in which the requesting server is located, obtaining the remaining link bandwidth of the link between each candidate source server in the domain in which the requesting server is located and the data center in which the requesting server is located, as a route bandwidth corresponding to the candidate source server; using a candidate source server in the domain of which the corresponding route bandwidth is greater than or equal to the smallest value among the required bandwidth corresponding to the requested data, the download bandwidth, and the upload bandwidth that can be allocated, as the selection criterion; and selecting, from the domain according to the selection criterion, the source server for transmitting the requested data. By preferably using a candidate server satisfying the selection criterion in the domain in which the requesting server is located as a source server for transmitting the requested data in the situation that there is no candidate server in the data center in which the requesting server is located, not only an assurance that the data transmission can be completed before the deadline can be provided, but also the use of high-cost cross-domain links is reduced.

On the basis of the previous implementation, in some optional implementations of this embodiment, the method for controlling data transmission of this embodiment may further include: obtaining a product line corresponding to the requesting server; and the process of selecting one of the candidate source servers as the source server for transmitting the requested data, based on the required bandwidth corresponding to the requested data, the download bandwidth, the upload bandwidth that each candidate source server can allocate, and the remaining bandwidth of the links between the candidate source servers and the requesting server may further include: if no source server for transmitting the requested data is selected from the domain, setting a route bandwidth corresponding to each candidate source server in another domain other than the domain as a pre-set upper bandwidth usage limit corresponding to the product line; using a candidate source server, among the candidate source servers in the other domain, of which the corresponding route bandwidth is greater than or equal to the smallest value among the required bandwidth corresponding to the requested data, the download bandwidth, and the upload bandwidth that can be allocated, as the selection criterion; and selecting, from the candidate source servers in the other domain according to the selection criterion, the source server for transmitting the requested data.

In some optional implementations of this embodiment, the process of selecting one of the candidate source servers as a source server for transmitting the requested data, based on the required bandwidth corresponding to the requested data, the download bandwidth, the upload bandwidth that each candidate source server can allocate, and the remaining bandwidth of the links between the candidate source servers and the requesting server may further include: if the number of candidate source servers satisfying the selection criterion is greater than one, selecting a candidate source server, of which the smallest value among the download bandwidth, the upload bandwidth that can be allocated, and the corresponding route bandwidth is the greatest, as the source server for transmitting the requested data. If the above-mentioned candidate source server satisfying the selection criterion is in the data center in which the requesting server is located, the route bandwidth corresponding to the candidate source server satisfying the selection criterion is infinitely great. By means of this implementation, when there are multiple candidate source servers satisfying the selection criterion, the optimal candidate source server can be selected as the source server for transmitting the requested data.

In some optional implementations of this embodiment, the method for controlling data transmission of this embodiment may further include: using the smallest value among the upload bandwidth that the selected source server can allocate, the corresponding route bandwidth, and the download bandwidth as a bandwidth allocated for transmitting the requested data, wherein if the selected source server is in the data center in which the requesting server is located, the route bandwidth corresponding to the selected source server is infinitely great. By means of this implementation, the control server reasonably allocates the link bandwidth, thereby reducing the waste of critical links.

In some optional implementations of this embodiment, the method for controlling data transmission of this embodiment may further include: if no source server for transmitting the requested data is selected, selecting a candidate source server, of which the smaller value between the upload bandwidth that can be allocated and the corresponding route bandwidth is the greatest, as a source server for transmitting the requested data, wherein the route bandwidth corresponding to the candidate source server in the data center in which the requesting server is located is infinitely great; and using the smaller value between the upload bandwidth that the selected source server can allocate and the corresponding route bandwidth as a bandwidth allocated for transmitting the requested data. By means of this implementation, the control server can select a relatively optimal candidate source server as the source server for transmitting the requested data in the case that there is no candidate source server satisfying all the above selection criteria in the entire system, and reasonably allocate the bandwidth.

According to the method for controlling data transmission provided by this embodiment, the bandwidth required for transmitting the requested data before the deadline is obtained based on the amount of the requested data, and one of the candidate source servers is selected as a source server for transmitting the requested data, based on the required bandwidth, bandwidth resources of the candidate source servers and the requesting server, and remaining bandwidth of the links between the candidate source servers and the requesting server, thereby implementing the selection of the most appropriate source server from a holistic perspective, ensuring that data transmission can be completed before the deadline, and effectively utilizing the link bandwidth.

Figure 3:
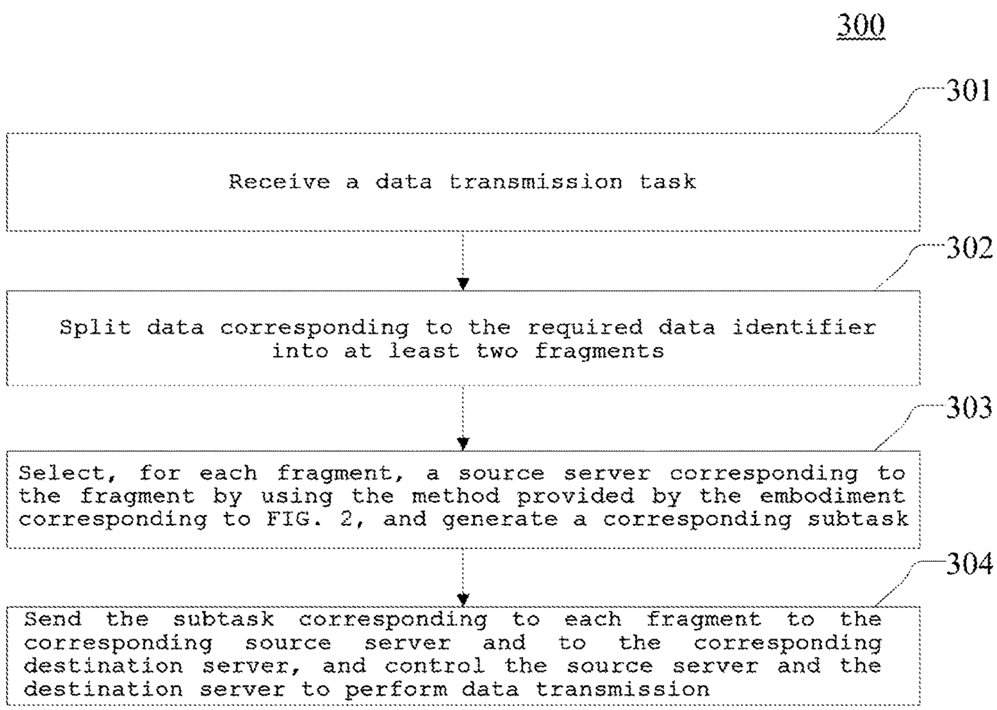
FIG. 3 is a flow chart of another embodiment of a method for controlling data transmission according to the present application.

Next, referring to FIG. 3, a process 300 of a method for controlling data transmission according to another embodiment of the present application is shown.

As shown in FIG. 3, the method for controlling data transmission of this embodiment includes the following steps:

Step 301: Receive a data transmission task.

The data transmission task includes the following information: a requested data identifier, a deadline, and a destination server identifier.

In this embodiment, an electronic device (for example, the control server 101 shown in FIG. 1) on which the method for controlling data transmission runs may receive, in a wired or wireless manner, a data transmission task sent by a server corresponding to the destination server identifier (for example, the servers 102, 103, 104, and 105 shown in FIG. 1).

Step 302: Split data corresponding to the requested data identifier into at least two fragments.

In this embodiment, the control server may split the data corresponding to the requested data identifier into at least two fragments by using various data fragmentation methods.

Step 303: Use, for each fragment, the fragment as requested data, the deadline as an instructed deadline, and a server corresponding to the destination server identifier as a requesting server, select a source server corresponding to the fragment by using the method provided by the embodiment corresponding to FIG. 2, and generate a corresponding subtask.

The above-mentioned subtask includes the following information: an identifier of the above-mentioned source server, the above-mentioned destination server identifier, and an identifier of the above-mentioned fragment.

In this embodiment, the concrete process of selecting a source server corresponding to the fragment can refer to the related description in the embodiment corresponding to FIG. 2, and will not be repeated herein. After the source server corresponding to the fragment is selected, the subtask corresponding to each fragment can be generated according to the above-mentioned identifier of the selected source server, the above-mentioned destination server identifier, and the above-mentioned identifier of the fragment.

Step 304: Send the subtask corresponding to each fragment to a source server corresponding to the source server identifier information of the subtask and a destination server corresponding to the above-mentioned destination server identifier information, and control the above-mentioned source server and the above-mentioned destination server to perform data transmission.

In this embodiment, the control server may send, in a wired or wireless manner, each subtask to the source server corresponding to the source server identifier information of the subtask and the destination server corresponding to the above-mentioned destination server identifier information; after receiving the subtask, the source server and the destination server perform data transmission (uploading or downloading) based on the information in the subtask.

In some optional implementations of this embodiment, the method for controlling data transmission of this embodiment may further include: prior to sending the subtask corresponding to each fragment to the source server corresponding to the source server identifier information of the subtask and the destination server corresponding to the destination server identifier information, combining subtasks that have an identical source server identifier and an identical destination server identifier. After the combination, the control server may control the source server and the destination server to perform data transmission for the individual fragments in the combined subtasks one by one. By means of this implementation, the number of subtasks is reduced, thereby lowering the computation scale and the computation burden of the control server.

In some optional implementations of this embodiment, the method for controlling data transmission of this embodiment may further include: prior to sending the subtask corresponding to each fragment to the source server corresponding to the source server identifier information of the subtask and the destination server corresponding to the destination server identifier information, determining, for each fragment, a bandwidth allocated for transmitting the above-mentioned fragment by using the method provided by some optional implementations in the embodiment corresponding to FIG. 2. In addition, the subtask corresponding to each fragment may further include information about the allocated bandwidth. In addition, the process of controlling the source server and the destination server to perform data transmission at step 304 may include: controlling, based on the information about the allocated bandwidth of the subtask, the source server and the destination server to perform data transmission. By means of this implementation, the control server reasonably allocates the link bandwidth, thereby reducing the waste of critical links.

In some optional implementations of this embodiment, the above-mentioned subtask may further include information about the deadline and information about a remaining amount of data. In addition, the method for controlling data transmission of this embodiment may further include: periodically (for example, every 10 seconds) using, for each subtask for which transmission has not been completed, the remaining amount of data of the subtask as the amount of the requested data, the deadline as an instructed deadline, and the server corresponding to the destination server identifier as a requesting server, and selecting a new source server corresponding to the subtask using the method provided by the embodiment corresponding to FIG. 2; determining a bandwidth newly allocated to the above-mentioned subtask using the method provided by some optional implementations in the embodiment corresponding to FIG. 2; and sending the above-mentioned subtask to the above-mentioned new source server and the above-mentioned destination server, and controlling, based on the bandwidth newly allocated to the subtask, the above-mentioned new source server and the above-mentioned destination server to perform the data transmission. By means of this implementation, the control server can dynamically adjust the source server and the bandwidth allocation for the fluctuation in online traffic, thereby more effectively utilizing the link bandwidth.

According to the method for controlling data transmission provided by this embodiment, by using the method provided by the embodiment corresponding to FIG. 2, the source server corresponding to the above-mentioned fragment is selected and a corresponding subtask is generated, the subtask corresponding to each fragment is sent to the corresponding source server and destination server, and then the source server and the destination server are controlled to perform data transmission, thereby implementing the selection of the most appropriate source server from a holistic perspective, ensuring that data transmission task can be completed before the deadline, and effectively utilizing the link bandwidth.

Figure 4:
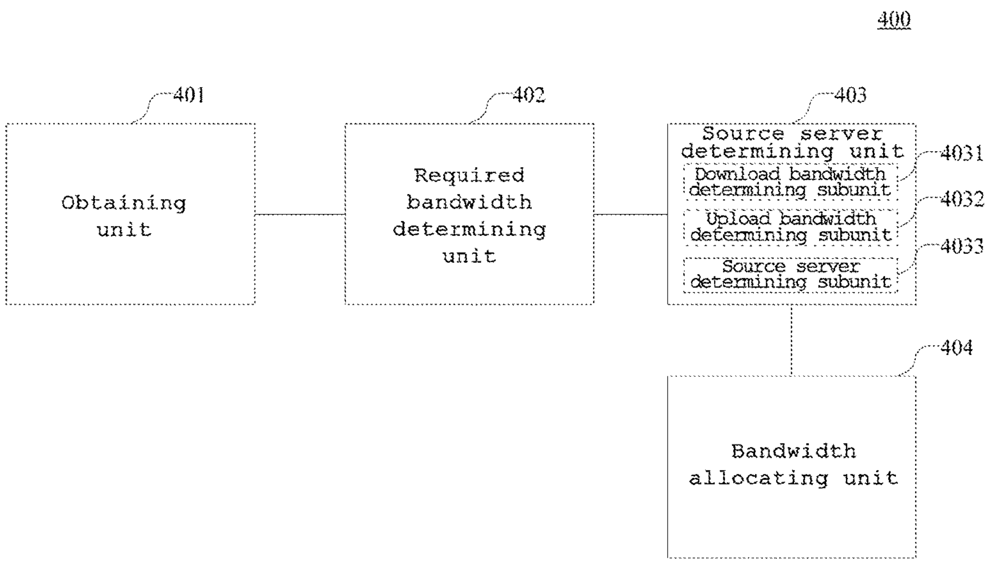
FIG. 4 is a structural schematic diagram of an embodiment of an apparatus for controlling data transmission according to the present application.

Further referring to FIG. 4, as an implementation of the above mentioned method shown in FIG. 2, the present application provides an embodiment of an apparatus for controlling data transmission. This apparatus embodiment corresponds to the method embodiment shown in FIG. 2. The apparatus may specifically be implemented in a control server.

As shown in FIG. 3, the apparatus for controlling data transmission 400 that is provided in this embodiment includes: an obtaining unit 401, a required bandwidth determining unit 402, and a source server determining unit 403. Specifically, the obtaining unit 401 is configured to obtain an amount of data requested by a requesting server, an instructed deadline, and candidate source servers storing the requested data. The required bandwidth determining unit 402 is configured to obtain, based on the amount of data, a minimum bandwidth required for transmitting the requested data before the deadline as a required bandwidth corresponding to the requested data. The source server determining unit 403 is configured to select one of the candidate source servers as a source server for transmitting the requested data, based on the required bandwidth, bandwidth resources of the candidate source servers and the requesting server, and remaining bandwidth of the links between the candidate source servers and the requesting server.

In this embodiment, the concrete processes of the obtaining unit 401, the required bandwidth determining unit 402, and the source server determining unit 403 can refer to the related descriptions of the step 201, the step 202, and the step 203 in the embodiment corresponding to FIG. 2 respectively, and will not be repeated herein.

In some optional implementations of this embodiment, the source server determining unit 403 may include: a download bandwidth determining subunit 4031 for obtaining a required bandwidth corresponding to the data currently downloaded by the above-mentioned requesting server, and determining a download bandwidth that the above-mentioned requesting server can allocate, based on the bandwidth resource of the above-mentioned requesting server, the above-mentioned currently downloaded data, and the above-mentioned required bandwidth corresponding to the requested data; an upload bandwidth determining subunit 4032 for obtaining, for each of the candidate servers, a required bandwidth corresponding to the data currently uploaded by the above-mentioned candidate source server, and determining an upload bandwidth that the candidate source server can allocate, based on the bandwidth resource of the above-mentioned candidate source server, the above-mentioned currently uploaded data, and the above-mentioned required bandwidth corresponding to the requested data; and a source server determining subunit 4033 for selecting one of the candidate source servers as the source server for transmitting the above-mentioned requested data, based on the required bandwidth corresponding to the requested data, the download bandwidth, the upload bandwidth that each candidate source server can allocate, and the remaining bandwidth of the links between the candidate source servers and the requesting server. The concrete processes of the download bandwidth determining subunit 4031, the upload bandwidth determining subunit 4032, and the source server determining subunit 4033 can refer to the related description of corresponding implementations in the embodiment corresponding to FIG. 2, and will not be repeated herein.

In some optional implementations of this embodiment, the source server determining subunit 4033 may include: a first selecting module (not shown in the figures) for using a candidate server in a data center in which the requesting server is located as a selection criterion; and selecting, according to the selection criterion, one of the candidate source servers as the source server for transmitting the requested data. The concrete processes of the first selecting module and the resulting technical effects can refer to the related description of corresponding implementations in the embodiment corresponding to FIG. 2, and will not be repeated herein.

On the basis of the previous implementation, in some optional implementations of this embodiment, the source server determining subunit 4033 may further include: a first route bandwidth determining module (not shown in the figures) for obtaining a remaining link bandwidth of a link between each candidate source server in a domain in which the requesting server is located and the data center in which the requesting server is located, as a route bandwidth corresponding to the candidate source server, if there is no candidate server in the data center in which the requesting server is located; and a second selecting module (not shown in the figures) for using a candidate source server in the domain of which the corresponding route bandwidth is greater than or equal to the smallest value among the required bandwidth corresponding to the requested data, the download bandwidth, and the upload bandwidth that can be allocated, as the selection criterion; and selecting, according to the selection criterion, the source server from the domain for transmitting the requested data. of the concrete processes of the first route bandwidth determining module and the second selecting module and the resulting technical effects can refer to the related description of corresponding implementations in the embodiment corresponding to FIG. 2, and will not be repeated herein.

On the basis of the previous implementation, in some optional implementations of this embodiment, the obtaining unit 401 may further be configured to obtain a product line corresponding to the requesting server. In addition, the above-mentioned source server determining subunit 4033 may further include: a second route bandwidth determining module (not shown in the figures) for setting a route bandwidth corresponding to each candidate source server in other domain in addition to the domain as a preset upper bandwidth usage limit corresponding to the above-mentioned product line, if no source server for transmitting the above-mentioned requested data is selected from the above-mentioned domain; and a third selecting module (not shown in the figures) for using a candidate source server, among the candidate source servers in the other domain, of which the corresponding route bandwidth is greater than or equal to the smallest value among the required bandwidth corresponding to the above-mentioned requested data, the above-mentioned download bandwidth, and the upload bandwidth that can be allocated, as the above-mentioned selection criterion and selecting, according to the above-mentioned selection criterion, the source server from the candidate source servers in the above-mentioned other domain for transmitting the requested data. The concrete process of this implementation can refer to the related description of corresponding implementations in the embodiment corresponding to FIG. 2, and will not be repeated herein.

In some optional implementations of this embodiment, the source server determining subunit 4033 may further include: a maximizing and minimizing module (not shown in the figures), configured to: if the number of candidate source servers satisfying the selection criterion is greater than one, select a candidate source server, of which the smallest value among the above-mentioned download bandwidth, the upload bandwidth that can be allocated, and the corresponding route bandwidth is the greatest, as the source server for transmitting the above-mentioned requested data. If the candidate source server satisfying the above-mentioned selection criterion is in the data center in which the requesting server is located, the route bandwidth corresponding to the candidate source server satisfying the above-mentioned selection criterion is infinitely great. The concrete process of this implementation and the resulting technical effects can refer to the related description of corresponding implementations in the embodiment corresponding to FIG. 2, and will not be repeated herein.

In some optional implementations of this embodiment, the apparatus for controlling data transmission of this embodiment may further include: a bandwidth allocating unit 404 for using the smallest value among the upload bandwidth that the selected source server can allocate, the corresponding route bandwidth, and the above-mentioned download bandwidth as a bandwidth allocated for transmitting the above-mentioned requested data. If the selected source server is in the data center in which the above-mentioned requesting server is located, the route bandwidth corresponding to the selected source server is infinitely great. The concrete process of this implementation and the resulting technical effects can refer to the related description of corresponding implementations in the embodiment corresponding to FIG. 2, and will not be repeated herein.

In some optional implementations of this embodiment, the source server determining subunit 4033 may further be configured to: if no source server for transmitting the above-mentioned requested data is selected, selecting a candidate source server, of which the smaller value between the upload bandwidth that can be allocated and the corresponding route bandwidth is the greatest, as the source server for transmitting the requested data, wherein the route bandwidth corresponding to the candidate source server in the data center in which the above-mentioned requesting server is located is infinitely great. In addition, the bandwidth allocating unit 404 may further be configured to use the smaller value between the upload bandwidth that the selected source server can allocate and the corresponding route bandwidth as a bandwidth allocated for transmitting the above-mentioned requested data. The concrete process of this implementation and the resulting technical effects can refer to the related description of corresponding implementations in the embodiment corresponding to FIG. 2, and will not be repeated herein.

According to the apparatus for controlling data transmission that is provided in this embodiment, the required bandwidth determining unit 402 obtains, based on the amount of the requested data, the bandwidth required for transmitting the requested data before the deadline, and the source server determining unit 403 selects one of the candidate source servers as a source server for transmitting the requested data, based on the required bandwidth, bandwidth resources of the candidate source servers and the requesting server, and remaining bandwidth of the links between the candidate source servers and the requesting server, thereby implementing the selection of the most appropriate source server from a holistic perspective, ensuring that data transmission can be completed before the deadline, and effectively utilizing the link bandwidth.

Figure 5:
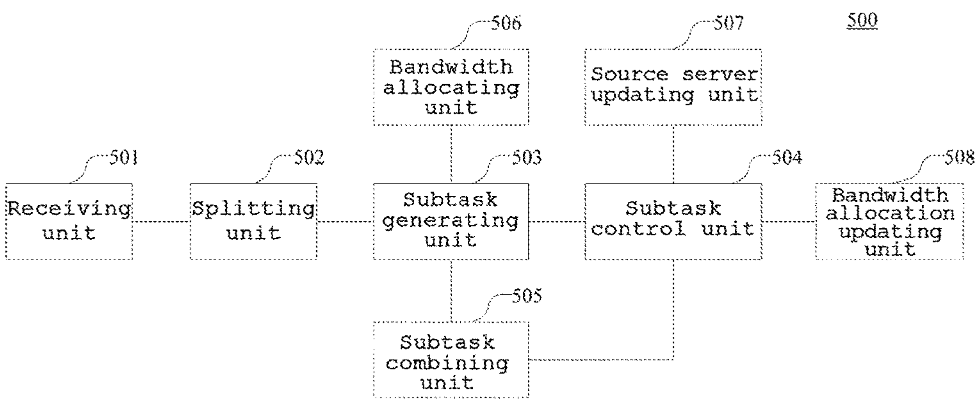
FIG. 5 is a structural schematic diagram of another embodiment of an apparatus for controlling data transmission according to the present application.

Continue referring to FIG. 5, as an implementation of the above method shown in FIG. 3, the present application provides another embodiment of an apparatus for controlling data transmission. This apparatus embodiment corresponds to the method embodiment shown in FIG. 3. The apparatus may specifically be implemented in a control server.

As shown in FIG. 5, the apparatus for controlling data transmission 500 that is provided in this embodiment includes: a task receiving unit 501, a splitting unit 502, a subtask generating unit 503, and a subtask control unit 504. Specifically, the task receiving unit 501 is configured to receive a data transmission task, wherein the above-mentioned data transmission task includes the following information: a requirement data identifier, a deadline, and a destination server identifier. The splitting unit 502 is configured to split data corresponding to the requirement data identifier into at least two fragments. The subtask generating unit 503 is configured to use, for each fragment, the above-mentioned fragment as requested data, to use the above-mentioned deadline as an instructed deadline, and to use a server corresponding to the above-mentioned destination server identifier as a requesting server, select a source server corresponding to the fragment using the apparatus that is provided in the embodiment corresponding to FIG. 4, and generate a corresponding subtask. The above-mentioned subtask includes the following information: an identifier of the above-mentioned source server, the above-mentioned destination server identifier, and an identifier of the above-mentioned fragment. The subtask control unit 504 is configured to: send the subtask corresponding to each fragment to a source server corresponding to the source server identifier information of the subtask and to a destination server corresponding to the above-mentioned destination server identifier information, and control the above-mentioned source server and the above-mentioned destination server to perform the data transmission.

In this embodiment, the concrete processes of the task receiving unit 501, the splitting unit 502, the subtask generating unit 503, and the subtask control unit 504 can refer to the related descriptions of the step 301, the step 302, the step 303, and the step 304 in the embodiment corresponding to FIG. 3 respectively, and will not be repeated herein.

In some optional implementations of this embodiment, the apparatus for controlling data transmission provided by this embodiment may further include a subtask combining unit 505 for combining subtasks that have an identical source server identifier and an identical destination server identifier before the subtask control unit sends the subtask corresponding to each fragment to the source server corresponding to the source server identifier information of the subtask and to the destination server corresponding to the above-mentioned destination server identifier information. The concrete process of the subtask combining unit 505 and the resulting technical effects can refer to the related description of corresponding implementations in the embodiment corresponding to FIG. 3, and will not be repeated herein.

In some optional implementations of this embodiment, the apparatus for controlling data transmission that is provided in this embodiment may further include a bandwidth allocating unit 506 for determining, for each fragment, a bandwidth allocated for transmitting the above-mentioned fragment by using the apparatus provided by some optional implementations in the embodiment corresponding to FIG. 3, before the subtask control unit sends the subtask corresponding to each fragment to the source server corresponding to the source server identifier information of the subtask and to the destination server corresponding to the above-mentioned destination server identifier information. In addition, the subtask corresponding to each fragment may further include information about the allocated bandwidth. In addition, the subtask control unit 504 may further be configured to control, based on the information about the allocated bandwidth of the subtask, the above-mentioned source server and the above-mentioned destination server to perform the data transmission. The concrete process of this implementation and the resulting technical effects can refer to the related description of corresponding implementations in the embodiment corresponding to FIG. 3, and will not be repeated herein.

In some optional implementations of this embodiment, the subtask may further include information about the deadline and information about a remaining amount of data. In addition, the apparatus for controlling data transmission provided by this embodiment may further include: a source server updating unit 507 for periodically using, for each subtask for which transmission has not been completed, the remaining amount of data of the subtask as the amount of the requested data, the deadline as an instructed deadline, and the server corresponding to the destination server identifier as a requesting server, and select a new source server corresponding to the subtask using the apparatus for controlling data transmission provided by the embodiment corresponding to FIG. 4; and a bandwidth allocation updating unit 508 for determining a bandwidth newly allocated to the above-mentioned subtask using the apparatus for controlling data transmission provided by some optional implementations in the embodiment corresponding to FIG. 4. In addition, the subtask control unit 504 may further be configured to: send the above-mentioned subtask to the above-mentioned new source server and the above-mentioned destination server, and control, based on the bandwidth newly allocated to the above-mentioned subtask, the above-mentioned new source server and the above-mentioned destination server to perform the data transmission. The concrete process of this implementation and the resulting technical effects can refer to the related description of corresponding implementations in the embodiment corresponding to FIG. 3, and will not be repeated herein.

According to the apparatus for controlling data transmission provided by this embodiment, the subtask generating unit 503 selects the source server corresponding to the fragment and generates a corresponding subtask, and the subtask control unit 504 sends the subtask corresponding to each fragment to the corresponding source server and to the destination server, and then controls the source server and the destination server to perform data transmission, thereby implementing the selection of the most appropriate source server from a holistic perspective, ensuring that data transmission task can be completed before the deadline, and effectively utilizing the link bandwidth.

Figure 6:
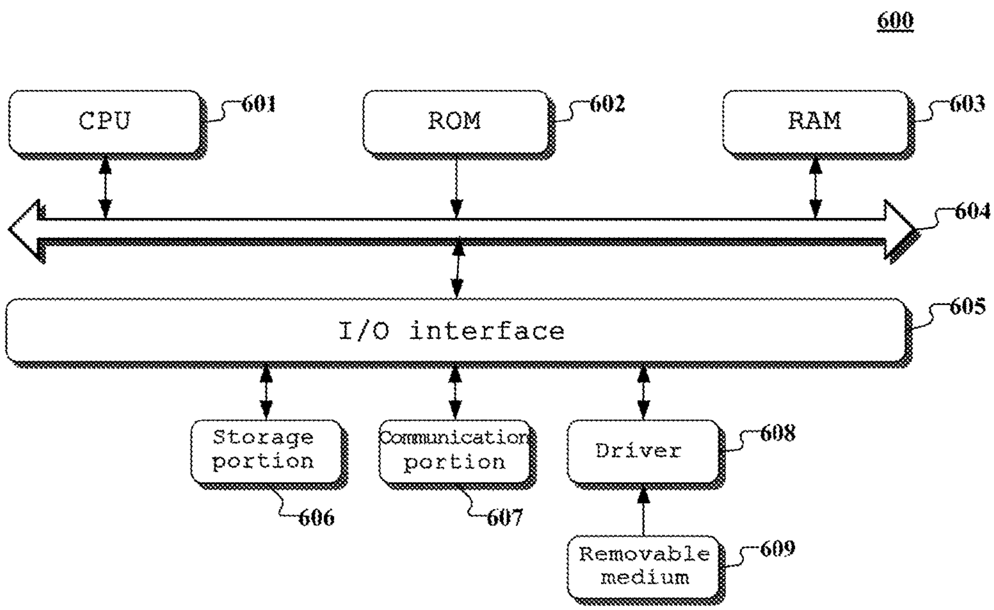
FIG. 6 is a structural schematic diagram of a computer system adapted to implement a control server of the embodiments of the present application.

Referring to FIG. 6, a structural schematic diagram of a computer system 600 adapted to implement a control server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: a storage portion 606 including a hard disk and the like; and a communication portion 607 comprising a network interface card, such as a LAN card and a modem. The communication portion 607 performs communication processes via a network, such as the Internet. A driver 608 is also connected to the I/O interface 605 as required. A removable medium 609, such as a magnetic disk, an optical disk, a magneto-optical disk, and a semiconductor memory, may be installed on the driver 608, to facilitate the retrieval of a computer program from the removable medium 609, and the installation thereof on the storage portion 606 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 607, and/or may be installed from the removable media 609. When the computer software program is executed by the central processing unit (CPU) 601, the functions defined by the method of the present application is performed.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising an obtaining unit, a required bandwidth determining unit and a source server determining unit, where the names of these units or modules are not considered as a limitation to the units or modules. For example, the obtaining unit may also be described as "a unit for obtaining an amount of data, the data requested by a requesting server, an instructed deadline, and candidate source servers storing the requested data".

In another aspect, the present application further provides a non-violate computer storage medium. The non-violate computer storage medium may be the non-violate computer storage medium included in the apparatus in the above embodiments, or a non-violate computer storage medium which has not been assembled into the apparatus. The non-violate computer storage medium stores one or more programs. The one or more programs, when executed by a device, cause the device to obtain an amount of data, the data requested by a requesting server, an instructed deadline, and candidate source servers storing the requested data; obtain, based on the amount of data, a minimum bandwidth required for transmitting the requested data before the deadline as a required bandwidth corresponding to the requested data; and select one of the candidate source servers as a source server for transmitting the requested data, based on the required bandwidth, bandwidth resources of the candidate source servers and the requesting server, and remaining bandwidth of links between the candidate source servers and the requesting server.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for controlling data transmission, comprising:

obtaining an amount of data, the data requested by a requesting server, an instructed deadline, and candidate source servers storing the requested data;

obtaining, based on the amount of data, a minimum bandwidth required for transmitting the requested data before the deadline as a required bandwidth corresponding to the requested data; and selecting one of the candidate source servers as a source server for transmitting the requested data, based on the required bandwidth, bandwidth resources of the candidate source servers and the requesting server, and remaining bandwidth of links between the candidate source servers and the requesting server, comprising obtaining a required bandwidth corresponding to data currently downloaded by the requesting server, and determining a download bandwidth that the requesting server is able to allocate, based on the bandwidth resource of the requesting server, the currently downloaded data, and the required bandwidth corresponding to the requested data;

obtaining, for each of the candidate source servers, a required bandwidth corresponding to data currently uploaded by the candidate source server, and determining an upload bandwidth that the candidate source server is able to allocate, based on the bandwidth resource of the candidate source server, the currently uploaded data, and the required bandwidth corresponding to the requested data;

using a candidate server in a data center in which the requesting server is located as a first selection criterion;

selecting one of the candidate source servers as the source server for transmitting the requested data, based on the first selection criterion, the required bandwidth corresponding to the requested data, the download bandwidth, the upload bandwidth that each of the candidate source servers is able to allocate, and the remaining bandwidth of the links between the candidate source servers and the requesting server;

obtaining a remaining link bandwidth of a link between each candidate source server in a domain in which the requesting server is located and the data center in which the requesting server is located, as a route bandwidth corresponding to the candidate source server, if there is no candidate server in the data center in which the requesting server is located;

using a candidate source server in the domain of which a corresponding route bandwidth is greater than or equal to a smallest value among the required bandwidth corresponding to the requested data, the download bandwidth, and the upload bandwidth that is able to be allocated, as a second selection criterion;

selecting, according to the second selection criterion, the source server from the domain for transmitting the requested data;

obtaining a product line corresponding to the requesting server, and setting a route bandwidth corresponding to each candidate source server in other domain in addition to the domain as a preset upper bandwidth usage limit corresponding to the product line, if no source server for transmitting the requested data is selected from the domain;

using a candidate source server, among the candidate source servers in the other domain, of which a corresponding route bandwidth is greater than or equal to a smallest value among the required bandwidth corresponding to the requested data, the download bandwidth, and the upload bandwidth that is able to be allocated, as a third selection criterion; and selecting, according to the third selection criterion, the source server for transmitting the requested data from the candidate source servers in the other domain.

2. The method according to claim 1, wherein the selecting one of the candidate source servers as the source server for transmitting the requested data, based on the required bandwidth corresponding to the requested data, the download bandwidth, the upload bandwidth that each of the candidate source servers is able to allocate, and the remaining bandwidth of the links between the candidate source servers and the requesting server further comprises:

selecting a candidate source server, of which a smallest value among the download bandwidth, the upload bandwidth that is able to be allocated, and the corresponding route bandwidth is the greatest, as the source server for transmitting the requested data, if a number of the candidate source servers satisfying the selection criterion is greater than one, wherein if the candidate source server satisfying the selection criterion is in the data center in which the requesting server is located, the route bandwidth corresponding to the candidate source server satisfying the selection criterion is infinity.

3. The method according to claim 1, further comprising:

using a smallest value among the upload bandwidth that the selected source server is able to allocate, the corresponding route bandwidth, and the download bandwidth as a bandwidth allocated for transmitting the requested data, wherein if the selected source server is in the data center in which the requesting server is located, the route bandwidth corresponding to the selected source server is infinity.

4. The method according to claim 1, further comprising:

if no source server for transmitting the requested data is selected, selecting the candidate source server, of which a smallest value between the upload bandwidth that is able to be allocated and the corresponding route bandwidth is the greatest, as the source server for transmitting the requested data, the route bandwidth corresponding to the candidate source server in the data center in which the requesting server is located being infinity; and using a smaller value between the upload bandwidth that the selected source server is able to allocate and the corresponding route bandwidth as a bandwidth allocated for transmitting the requested data.

5. A method for controlling data transmission, comprising:

receiving a data transmission task, the data transmission task comprising a requirement data identifier, a deadline, and a destination server identifier;

splitting data corresponding to the requirement data identifier into at least two fragments;

using, for each of the at least two fragments, the fragment as requested data, the deadline as an instructed deadline, and a server corresponding to the destination server identifier as a requesting server, and selecting from candidate source servers a source server corresponding to the fragment by:

obtaining a required bandwidth corresponding to data currently downloaded by the requesting server, and determining a download bandwidth that the requesting server is able to allocate, based on the bandwidth resource of the requesting server, the currently downloaded data, and the required bandwidth corresponding to the requested data;

obtaining, for each of the candidate source servers, a required bandwidth corresponding to data currently uploaded by the candidate source server, and determining an upload bandwidth that the candidate source server is able to allocate, based on the bandwidth resource of the candidate source server, the currently uploaded data, and the required bandwidth corresponding to the requested data;

using a candidate server in a data center in which the requesting server is located as a first selection criterion;

selecting one of the candidate source servers as the source server for transmitting the requested data, based on the first selection criterion, the required bandwidth corresponding to the requested data, the download bandwidth, the upload bandwidth that each of the candidate source servers is able to allocate, and the remaining bandwidth of the links between the candidate source servers and the requesting server;

obtaining a remaining link bandwidth of a link between each candidate source server in a domain in which the requesting server is located and the data center in which the requesting server is located, as a route bandwidth corresponding to the candidate source server, if there is no candidate server in the data center in which the requesting server is located;

using a candidate source server in the domain of which a corresponding route bandwidth is greater than or equal to a smallest value among the required bandwidth corresponding to the requested data, the download bandwidth, and the upload bandwidth that is able to be allocated, as a second selection criterion;

selecting, according to the second selection criterion, the source server from the domain for transmitting the requested data;

obtaining a product line corresponding to the requesting server, and setting a route bandwidth corresponding to each candidate source server in other domain in addition to the domain as a preset upper bandwidth usage limit corresponding to the product line, if no source server for transmitting the requested data is selected from the domain;

using a candidate source server, among the candidate source servers in the other domain, of which a corresponding route bandwidth is greater than or equal to a smallest value among the required bandwidth corresponding to the requested data, the download bandwidth, and the upload bandwidth that is able to be allocated, as a third selection criterion; and selecting, according to the third selection criterion, the source server for transmitting the requested data from the candidate source servers in the other domain generating a corresponding subtask, the subtask comprising: an identifier of the source server, the destination server identifier, and an identifier of the fragment; and sending the subtask corresponding to each of the at least two fragments to a source server corresponding to source server identifier information of the subtask and to a destination server corresponding to destination server identifier information, and controlling the source server and the destination server to perform data transmission.

6. The method according to claim 5, further comprising: combining subtasks having an identical source server identifier and an identical destination server identifier, prior to sending the subtask corresponding to each of the at least two fragments to the source server corresponding to the source server identifier information of the subtask and the destination server corresponding to the destination server identifier information.

7. The method according to claim 5, further comprising: determining, for each of the at least two fragments, a bandwidth allocated for transmitting the fragment, prior to sending the subtask corresponding to each of the at least two fragments to the source server corresponding to the source server identifier information of the subtask and to the destination server corresponding to the destination server identifier information, the determining the bandwidth allocated for transmitting the fragment comprising:

using a smallest value among the upload bandwidth that the selected source server is able to allocate, the corresponding route bandwidth, and the download bandwidth as the bandwidth allocated for transmitting the requested data, wherein if the selected source server is in the data center in which the requesting server is located, the route bandwidth corresponding to the selected source server is infinity;

the subtask corresponding to each of the at least two fragments further comprising information about the allocated bandwidth; and the controlling the source server and the destination server to perform the data transmission comprising:

controlling, based on the information about the allocated bandwidth of the subtask, the source server and the destination server to perform the data transmission.

8. The method according to claim 7, wherein the subtask further comprises information about the deadline and information about a remaining amount of data; and the method further comprises:

periodically using, for each subtask for which transmission has not been completed, the remaining amount of data of the subtask as the amount of the requested data, the deadline as the instructed deadline, and the server corresponding to the destination server identifier as the requesting server, and selecting a new source server corresponding to the subtask;

determining a bandwidth newly allocated to the subtask by using a smallest value among the upload bandwidth that the new source server is able to allocate, the corresponding route bandwidth, and the download bandwidth as the bandwidth newly allocated to the subtask, wherein if the selected source server is in the data center in which the requesting server is located, the route bandwidth corresponding to the selected source server is infinity; and sending the subtask to the new source server and the destination server, and controlling, based on the bandwidth newly allocated to the subtask, the new source server and the destination server to perform data transmission.

9. An apparatus for controlling data transmission, comprising:

at least one processor; and a memory storing instructions, the instructions when executed by the at least one processor, cause the at least one processor to perform operations, the operations comprising:

obtaining an amount of data, the data requested by a requesting server, an instructed deadline, and candidate source servers storing the requested data;

obtaining, based on the amount of data, a minimum bandwidth required for transmitting the requested data before the deadline as a required bandwidth corresponding to the requested data; and selecting one of the candidate source servers as a source server for transmitting the requested data, based on the required bandwidth, bandwidth resources of the candidate source servers and the requesting server, and remaining bandwidth of links between the candidate source servers and the requesting server, comprising obtaining a required bandwidth corresponding to data currently downloaded by the requesting server, and determining a download bandwidth that the requesting server is able to allocate, based on the bandwidth resource of the requesting server, the currently downloaded data, and the required bandwidth corresponding to the requested data;

obtaining, for each of the candidate source servers, a required bandwidth corresponding to data currently uploaded by the candidate source server, and determining an upload bandwidth that the candidate source server is able to allocate, based on the bandwidth resource of the candidate source server, the currently uploaded data, and the required bandwidth corresponding to the requested data;

using a candidate server in a data center in which the requesting server is located as a first selection criterion;

selecting one of the candidate source servers as the source server for transmitting the requested data, based on the first selection criterion, the required bandwidth corresponding to the requested data, the download bandwidth, the upload bandwidth that each of the candidate source servers is able to allocate, and the remaining bandwidth of the links between the candidate source servers and the requesting server;

obtaining a remaining link bandwidth of a link between each candidate source server in a domain in which the requesting server is located and the data center in which the requesting server is located, as a route bandwidth corresponding to the candidate source server, if there is no candidate server in the data center in which the requesting server is located;

using a candidate source server in the domain of which a corresponding route bandwidth is greater than or equal to a smallest value among the required bandwidth corresponding to the requested data, the download bandwidth, and the upload bandwidth that is able to be allocated, as a second selection criterion;

selecting, according to the second selection criterion, the source server from the domain for transmitting the requested data;

obtaining a product line corresponding to the requesting server, and setting a route bandwidth corresponding to each candidate source server in other domain in addition to the domain as a preset upper bandwidth usage limit corresponding to the product line, if no source server for transmitting the requested data is selected from the domain;

using a candidate source server, among the candidate source servers in the other domain, of which a corresponding route bandwidth is greater than or equal to a smallest value among the required bandwidth corresponding to the requested data, the download bandwidth, and the upload bandwidth that is able to be allocated, as a third selection criterion; and selecting, according to the third selection criterion, the source server for transmitting the requested data from the candidate source servers in the other domain.

10. The apparatus according to claim 9, wherein the operations further comprise:

using a smallest value among the upload bandwidth that the selected source server is able to allocate, the corresponding route bandwidth, and the download bandwidth as a bandwidth allocated for transmitting the requested data, wherein if the selected source server is in the data center in which the requesting server is located, the route bandwidth corresponding to the selected source server is infinity.

11. An apparatus for controlling data transmission, comprising:

at least one processor; and a memory storing instructions, the instructions when executed by the at least one processor, cause the at least one processor to perform operations, the operations comprising:

receiving a data transmission task, the data transmission task comprising a requirement data identifier, a deadline, and a destination server identifier;

splitting data corresponding to the requirement data identifier into at least two fragments;

using, for each of the at least two fragments, the fragment as requested data, the deadline as an instructed deadline, and a server corresponding to the destination server identifier as a requesting server, and selecting a source server corresponding to the fragment by using the apparatus according to claim 9, and generating a corresponding subtask, the subtask comprising: an identifier of the source server, the destination server identifier, and an identifier of the fragment; and sending the subtask corresponding to each of the at least two fragments to a source server corresponding to source server identifier information of the subtask and to a destination server corresponding to destination server identifier information, and controlling the source server and the destination server to perform data transmission.

12. The apparatus according to claim 11, wherein the operations further comprise:

determining, for each of the at least two fragments, a bandwidth allocated for transmitting the fragment, before sending the subtask corresponding to each of the at least two fragments to the source server corresponding to the source server identifier information of the subtask and to the destination server corresponding to the destination server identifier information, the determining the bandwidth allocated for transmitting the fragment comprising:

using a smallest value among the upload bandwidth that the selected source server is able to allocate, the corresponding route bandwidth, and the download bandwidth as the bandwidth allocated for transmitting the requested data, wherein if the selected source server is in the data center in which the requesting server is located, the route bandwidth corresponding to the selected source server is infinity;

the subtask corresponding to each of the at least two fragments further comprising information about the allocated bandwidth; and the controlling the source server and the destination server to perform the data transmission comprising: controlling, based on the information about the allocated bandwidth of the subtask, the source server and the destination server to perform the data transmission.

* * * * *